US008996011B2

(12) United States Patent
Lundén et al.

(10) Patent No.: US 8,996,011 B2
(45) Date of Patent: Mar. 31, 2015

(54) MOBILITY STATE ESTIMATION ENHANCEMENT FOR SMALL CELL AND HETEROGENEOUS NETWORK DEPLOYMENTS

(71) Applicant: Nokia Corporation, Espoo (FI)

(72) Inventors: Jari Petteri Lundén, Espoo (FI); Elena Virtej, Espoo (FI)

(73) Assignee: Nokia Corporation, Espoo (FI)

( * ) Notice: Subject to any disclaimer, the term of this patent is extended or adjusted under 35 U.S.C. 154(b) by 117 days.

(21) Appl. No.: 13/759,575

(22) Filed: Feb. 5, 2013

(65) Prior Publication Data

US 2014/0220973 A1    Aug. 7, 2014

(51) Int. Cl.
*H04W 36/32*    (2009.01)
*H04W 24/02*    (2009.01)
*H04W 36/00*    (2009.01)
*H04W 24/10*    (2009.01)

(52) U.S. Cl.
CPC .............. *H04W 36/32* (2013.01); *H04W 24/02* (2013.01); *H04W 24/10* (2013.01); *H04W 36/0083* (2013.01)
USPC .......................... 455/436; 455/440; 455/456.1

(58) Field of Classification Search
CPC ..... H04W 36/04; H04W 36/32; H04W 16/32; H04W 36/0055; H04L 43/0852
USPC ........................ 455/436, 440–444, 456.1–457
See application file for complete search history.

(56) References Cited

U.S. PATENT DOCUMENTS 5,530,910 A * 6/1996 Taketsugu ...................... 455/444
2012/0131129 A1* 5/2012 Agarwal et al. ............... 709/216
2012/0327797 A1* 12/2012 Siomina et al. ............... 370/252

FOREIGN PATENT DOCUMENTS

WO    2012/140470 A1    10/2012

OTHER PUBLICATIONS

David Lopez-Perez, "Mobility Management Challenges in 3GPP Heterogeneous Networks", Topics in Radio Communications, IEEE Communications Magazine, Dec. 2012, pp. 70-78.
3GPP TR 36.839 V11.1.0, "3rd Generation Partnership Project; Technical Specification Group Radio Access Network; Evolved Universal Terrestrial Radio Access (E-UTRA); Mobility Enhancements in Heterogeneous Networks (Release 11)", Dec. 2012, 54 pages.
Renesas Electronics Europe, Ltd., "Imporved Mobility State Estimation Procedure", 3GPP TSG-RAN WG2 Meeting #75bis, R2-115141, Oct. 14, 2011, 4 pages.
(Continued)

*Primary Examiner* — Chuong A Ngo
(74) *Attorney, Agent, or Firm* — Squire Patton Boggs (US) LLP

(57) ABSTRACT

Various communication systems may benefit from mobility state estimation (MSE) enhancement for small cell and heterogeneous network (HetNet) deployments of the same. For example, a first user equipment (UE) and a second user equipment traveling through a HetNet may pass through a varying number of cells causing a poor MSE for each. A method may comprise performing a MSE. The method may include determining whether at least one cell change results in UE staying less than a predetermined time in a cell and filtering out from the MSE the at least one cell change, when the UE stays less than the predetermined time in the cell. The method may also comprise including the at least one cell change in the MSE when the UE stays at least the predetermined time in the cell.

20 Claims, 4 Drawing Sheets

(56) References Cited

OTHER PUBLICATIONS

Nokia Siemens Networks, Nokia Corporation, "Enhancements for UE Mobility State Estimation", 3GPP TSG-RAN WG2 Meeting #75, R2-114316, Aug. 22-26, 2011, 5 pages.

Alcatel-Lucent, Alcatel-Lucent Shanghai Bell, "On UE-Speed-Based Methods for Improving the Mobility Performance in HetNets", 3GPP TSG-RAN WG2 Meeting #77, R2-120652, Feb. 6-10, 2012, 6 pages.

European Search Report application No. 14152960.2 dated May 30, 2014.

* cited by examiner

MOBILITY STATE ESTIMATION ENHANCEMENT FOR SMALL CELL AND HETEROGENEOUS NETWORK DEPLOYMENTS

BACKGROUND

1. Field

Various communication systems may benefit from mobility state estimation (MSE) enhancement. For example, communication systems that include small cell and heterogeneous network (HetNet) deployments may experience improved mobile performance of user equipment.

2. Description of the Related Art

With the development of mobile communication technology, there is an increased demand in high quality and high data speed of the connection that a User Equipment (UE) should be experiencing even at high speeds. For Long Term Evolution (LTE), the requirements of the speed may reach over 300 km/hr. In order to enable the UE to have a sustainable call and/or uninterrupted data connection while moving, the network may need to achieve large-scale coverage. The UE may need to complete several mobility processes, including cell selection and cell reselection in the IDLE state, and cell change in the RRC-CONNECTED state. In the mobility process UE is configured to have some network parameters. In order to get the optimal mobility performances when UE is under different speeds in the network, the configuration of these parameters may need to be adjusted accordingly. However, it has been identified that the current MSE mechanism may not perform well in heterogeneous network (HetNet) deployments or scenarios. A HetNet may be described as a radio access network that comprises layers of different-sized cells ranging from big (macrocells) to small (picocells and femtocells). However, it should be noted that in some areas the network may consist of similar type only (e.g., macrocells).

The concept of a HetNet has emerged in the context of Long Term Evolution (LTE) and LTE-Advanced. In order to reach the full bandwidth capacity of either technology, operators may need to supplement their traditional large macrocells with smaller cells, e.g., for providing additional capacity at usage hotspots.

HetNet may define how all those different-sized cells will work together, how hand-off among them will be achieved, and how interference among them will be minimized.

Therefore, if in the case of having HetNet deployment, the network may get the mobility state of UE, it may greatly improve the UE mobility performances. In Universal Mobile Telecommunication Systems (UMTS), so as to achieve the purpose and optimize the mobility performances, the mobility state is divided into 2 states. One is the normal-mobility state and the other is the high-mobility state. Further, in the LTE system, due to the support to the high speed scenario, the mobility state is divided into 3 states, including normal-mobility state, medium mobility state and high-mobility state.

When developing into the LTE-A system, in order to increase the coverage rate of high speed data, temporary network coverage and cell edge throughput, the Heterogeneous Network (HetNet) is introduced with a mix deployment of macro and low power nodes (LPN), which consist of picocells, H-eNBs (Home eNode B), LTE femtocells, and/or relay nodes.

In a heterogeneous network macrocells are regarded as the initial deployment, and picocells, H-eNBs and/or relay nodes are added for incremental capacity growth, richer user experience and in-building coverage.

In the UMTS system and LTE system, a relatively accurate UE mobility state estimation (MSE) is easy to achieve through the existing MSE algorithm. However, the existing MSE algorithm may not be suitable in the HetNet of a LTE/LTE-A system.

This is because all cell changes are conventionally counted equally in existing MSE, regardless of the cell size or duration. Therefore, a user equipment (UE) moving in a macrocell network counts cell changes, for example, cell reselections in IDLE mode, within the evaluation window and arrives to a certain MSE. Thus, if picocells are deployed in addition to a macro network, the density of the picocells greatly affects the MSE because of the relatively small size of the picocells.

In addition to this, there are short cell changes, for example, UE stays in a cell for short time before another cell change caused mainly by variations and uncertainty in cell change measurements as well as the irregularity of the cell borders. Ping-pong cell changes, where the UE goes from cell A to cell B and back to cell A again are removed from the traditional MSE according to the current 3GPP TS 36.304 V11.2.0 (2012-12) specification, herein incorporated by reference. However, any short cell change is a less robust indication for the macro-scale mobility. So, there are these two main aspects to deal with in order to provide a more robust indication for UE mobility aspect. For example, cell changes macro1→macro2→macro3 within a short time (so that UE could not have possibly moved through, e.g., a 500 meter macrocell, or even through a large portion of it) is likely a case of UE at border of 3 cells so that UE goes basically from macro1 to macro3, but makes a brief cell change to macro2 in-between. This is not a ping-pong as such and may be counted in a traditional MSE, but nevertheless it is a cell change that may be considered to introduce noise to the MSE, not so much real information on mobility state, especially on macro-scale.

Moreover, the traditional MSE does not count the ping-pong reselections/cell changes. In other words, the UE shall not count consecutive reselections between the same two cells into mobility state detection criteria if the same cell is reselected just after one other reselection.

This means that traditional MSE filters out ping-pong cell changes. In other words, cell 1→cell 2→cell 1 is not counted, or is counted as just one cell change instead of two. This may be useful in a HetNet scenario, where the effect of cell changes to picocells that are deployed sparsely in macro cells may be filtered out from MSE. However, this does not filter out all short cell changes. For example, short cell changes may have a significant impact on the MSE and mobility state, regardless of whether or not they are due to ping-pongs or involve small cells. Moreover, these short cell changes may not represent a true picture of the UE mobility.

SUMMARY

According to a first embodiment, a method may comprise performing a mobility state estimation. The method may include determining whether at least one cell change results in a user equipment staying less than a predetermined time in a cell. The method may also include filtering out from the mobility state estimation the at least one cell change, when the user equipment stays less than the predetermined time in the cell. The method may further comprise including the at least one cell change in the mobility state estimation when the user equipment stays at least the predetermined time in the cell.

According to a second embodiment, an apparatus may comprise at least one processor and at least one memory including computer program code. Further, the at least one memory and the computer program code are configured to, with the at least one processor, cause the apparatus at least to perform a mobility state estimation. Also, the at least one memory and the computer program code are configured to, with the at least one processor, cause the apparatus at least to determine whether at least one cell change results in a user equipment staying less than a predetermined time in a cell and filter out from the mobility state estimation the at least one cell change, when the user equipment stays less than the predetermined time in the cell. For example, the user equipment stays in the cell less than the predetermined time, the at least one cell change is not counted in the mobility state estimation count. In addition, the at least one memory and the computer program code are configured to, with the at least one processor, cause the apparatus at least to include the at least one cell change in the mobility state estimation when the user equipment stays at least the predetermined time in the cell.

According to a third embodiment, an apparatus may comprise performing means for performing a mobility state estimation. The apparatus may include determining means for determining whether at least one cell change results in a user equipment staying less than a predetermined time in a cell. The apparatus may also include filtering means for filtering out from the mobility state estimation the at least one cell change, when the user equipment stays less than the predetermined time in the cell. The apparatus may further comprise including means for including the at least one cell change in the mobility state estimation when the user equipment stays at least the predetermined time in the cell.

According to a fourth embodiment, a non-transitory computer readable medium may be encoded with instruction that, when executed in hardware, perform a process, the process comprising the method according to the first embodiment.

BRIEF DESCRIPTION OF THE DRAWINGS

For proper understanding of the invention, reference should be made to the accompanying drawings, wherein.

DETAILED DESCRIPTION

Figure 1:
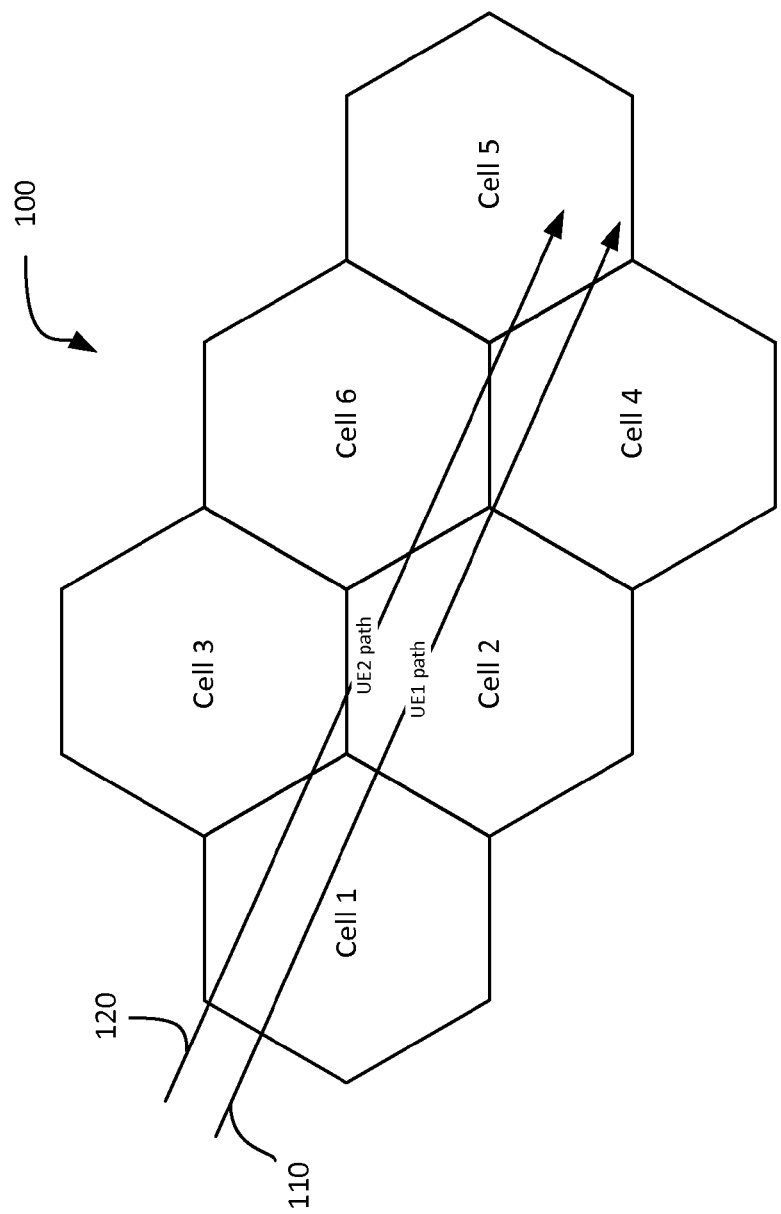
FIG. 1 illustrates an example scenario according to certain embodiments.

With the introduction of Low Power Node (LPN) into Long Term Evolution-Advanced (LTE-A) systems, the network structure of the mobile communication system becomes more complex in the Heterogeneous Network (HetNet). The User Equipment (UE) in the HetNet has new characteristics, which greatly increase the difficulty and complexity of obtaining an accurate UE Mobility State Estimation (MSE), and pose a challenge for traditional MSE algorithms. For example, traditional mobility state estimation (MSE) currently specified in a Long Term Evolution (LTE) system or Long Term Evolution Advanced (LTE-A) system performs somewhat unpredictably in heterogeneous network (HetNet) deployments. Therefore, if the HetNet network can obtain the mobility state or MSE of User Equipment (UE), it will greatly improve the mobile performance of the UE. Additionally, there is benefit of UE obtaining itself an accurate MSE and scaling certain parameters, in particular cell change related parameters such as for example time-to-trigger for triggering measurement event reports based on the MSE. A new enhanced method, according to certain embodiments may improve the user equipment MSE accuracy with a more stable MSE and a more robust/reliable indication of macro-scale mobility.

Certain embodiments related to enhancing the mobility state estimation in LTE, especially in context of heterogeneous network deployments or small cell scenarios. For example, certain embodiments may improve mobility performance in HetNet in single carrier or multicarrier environments, for example, including Carrier Aggregation (CA) and non-CA cases. As discussed above, the current MSE may work well in a macro cell network, but not in heterogeneous network (HetNet) deployments with varying cell sizes.

In addition, small cells enhancements for E-UTRA and E-UTRAN may benefit from a more stable and robust MSE.

Certain embodiments are concerned about filtering out, not including, excluding, not taking into account, or not considering short cell changes in general, for example, cell reselections in the MSE, MSE count, or other procedure or method for obtaining an estimate of UE's mobility state or speed. For instance, if UE stays in a cell for a shorter time than T_min, for example, 5 seconds, as a predetermined time, the system may not count that cell change in the MSE, MSE count, or other procedure or method for obtaining an estimate of UE's mobility state or speed. More specifically, the method may remove from the MSE or MSE count (or alike procedures), cell changes that result in UE staying a very short time in a cell, for example less than 5 seconds, regardless of whether the UE returns back to the original cell. This technique can also cover extended ping-pong cell changes with multiple cells in-between. The threshold duration for removing HO from MSE or MSE count (or any similar MSE type of procedure or count) may depend on the cell size (shorter for small cells), or alternatively set so that most picocell cell changes are filtered out in addition to the macro ping-pongs, unless the UE stops in a picocell. Using this technique the picocells may be filtered out of or not included in the MSE if the UE is moving, because due to their smaller size, the UE stays a short time in the picocells.

In some embodiments, the threshold for not counting or taking into account a cell change in MSE may be configured to UE by the network. In some other embodiments, the threshold may be defined by the specification. In some other embodiments, the threshold may be determined autonomously by the UE, for example, based on an observed duration of stay in cells or by determining a threshold for stay that is long enough for successful offloading.

In some embodiments, a different threshold is used for inter-frequency cells than for intra-frequency cells.

In certain embodiments a cell change may include at least one of cell handover, cell selection, and cell reselection. A handover may be one kind of cell change.

FIG. 1 illustrates an example HetNet 100 scenario in which two user equipment move along paths (110, 120) at the same speed in a macrocell network. User equipment 1 (UE1) moving along path 110 counts/may count cell change to four cells during the MSE window of evaluation. User equipment 2 (UE2) moving along path 120 counts/may count cell change to six cells during the MSE evaluation window. There is a clear difference in the count (4 vs. 6), even though both UE paths (110, 120) include UEs moving at the same speed in the same network. However, if the short time frame cell changes are filtered out, then UE2 path 120 would not count cells 3 and 4 as shown in FIG. 1. Thus, UE2 path 120 would now be counted as a total of 4 cells as well during the MSE window.

In reality, the cell borders are not as smooth as shown in FIG. 1, so there may be even more short stays and even some ping-pongs. But this simplified consideration already shows that filtering out short cell changes may result in a more stable MSE or MSE measure or count.

This technique may also filter out (or not count, or not take into account) fast macro-cell changes. Filtering out (or not counting, or not taking into account) short cell changes may make the resulting MSE a more robust indication of macro-scale mobility. If a UE stays in a cell for very short time, it is likely that the cell change was unnecessary and thus not a reliable indication on UE's inherent mobility state.

In some embodiments, when a cell change is filtered out from (or not counted to, or not taken into account in) MSE, it means that when UE goes from cell1 to cell2 to cell3, where UE stays in cell2 only a short time, UE counts this as only 1 cell change. Whereas in some other embodiments, UE counts this as 0 cell changes in this case possibly until UE leaves cell3. Yet in some other embodiments, the UE counts some other number, e.g. 0.5, cell changes in this case, or a number that is dependent on the duration of UE's stay in cell2.

Figure 2:
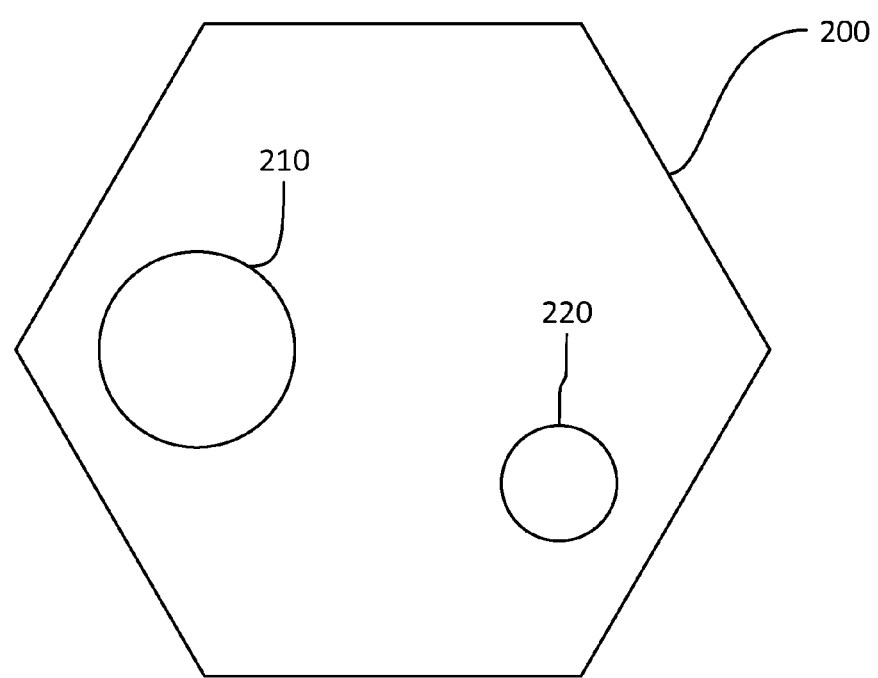
FIG. 2 illustrates an example heterogeneous network cell according to certain embodiments.

Alternatively, this technique may be used in combination with weighting different types of cell changes differently. In other words, small cell handovers could be counted with smaller weight. This technique may replace or enhance the ping-pong filtering with something more robust such as removing short stay in a cell instead of or in addition to just ping-pong. Simple ping-pong may not be as descriptive of an unnecessary cell change as a cell change that results a short stay in the cell, especially in comparison to the cell size, T_min could depend on cell type/size. This may be the case, for example, with an isolated small cell deployed within coverage of macro cell, as shown in FIG. 2. A cell change of a moving UE to an isolated small cell is often a ping-pong, even if it is long enough to be useful, for example, for offloading. Therefore it should not be filtered out from the MSE or MSE like procedure, unless it is short in duration.

As another example, it is assumed that UE1 is moving along path 110 really fast and UE2 is moving along path 120 slowly, so that UE1 makes a cell change to small cell and its short time of stay there would be shorter than T_min, while the UE2 would take longer time to go through the small cell due to slow moving speed. If it is assumed UE1 moves very fast, it would not count small cells if passing through them in shorter time than T_min. However, a fast moving UE1 would also travel a much longer distance during the MSE evaluation window than a slow moving UE2. Because of this, UE1 would go through many more macro cells than UE2 and thus end up with a high MSE or MSE count (or any similar MSE type of procedure or count) even though the small cell is not counted. Instead, a slow moving UE2 could include the small cell in the count, but the total number of cell changes in the MSE window would be reduced due to the short distance traveled. Again, the UE may/does not count cells where it stays shorter time than a predetermined time, T_min into mobility state detection criteria.

In one exemplary embodiment, one way to express this idea is to consider that the UE shall not count cells where it stays shorter time than T_min into mobility state detection criteria.

Additionally, T_min would be configured by network and specified elsewhere, for example, in Radio Resource Control (RRC) specification. Predetermined time, T_min, could depend on cell type/size and/or on whether the cell change was for coverage or offloading purpose. This could be indicated in the cell change or handover (HO) command or known based on Physical Cell Identity (PCI) of the cell. For example, UE could be indicated by a range of PCIs for small cells or based on whether it was an inter-frequency HO or intra-frequency HO.

Alternatively, it may be noted that the MSE is primarily for UE. Although the network may obtain the same information from UE's cell change history, this could be also signaled from UE to network, especially when UE is transitioning from IDLE to CONNECTED modes.

Alternatively, in another exemplary embodiment, the network could obtain the same info from UE signalling to network, part of UE mobility assistance information.

FIG. 2 illustrates a heterogeneous network (HetNet) macrocell 200 comprising a picocell 210 and a femtocell 220. Macrocell 200 may be a cell in a mobile phone network that provides radio coverage served by a high power cellular base station (tower). Picocell 210 may be a small cellular base station typically covering a small area, such as in-building (offices, train stations, shopping malls, libraries, etc.), or more recently in aircraft. Femtocell 220 may be a small, low-power cellular base station, typically designed for use in a home or small business. A broader term which is more often used is small cell, with femtocells and picocells as subsets.

In some embodiments macrocell 200 may include a plurality of picocells and/or femtocells as part of the HetNet.

Figure 3:
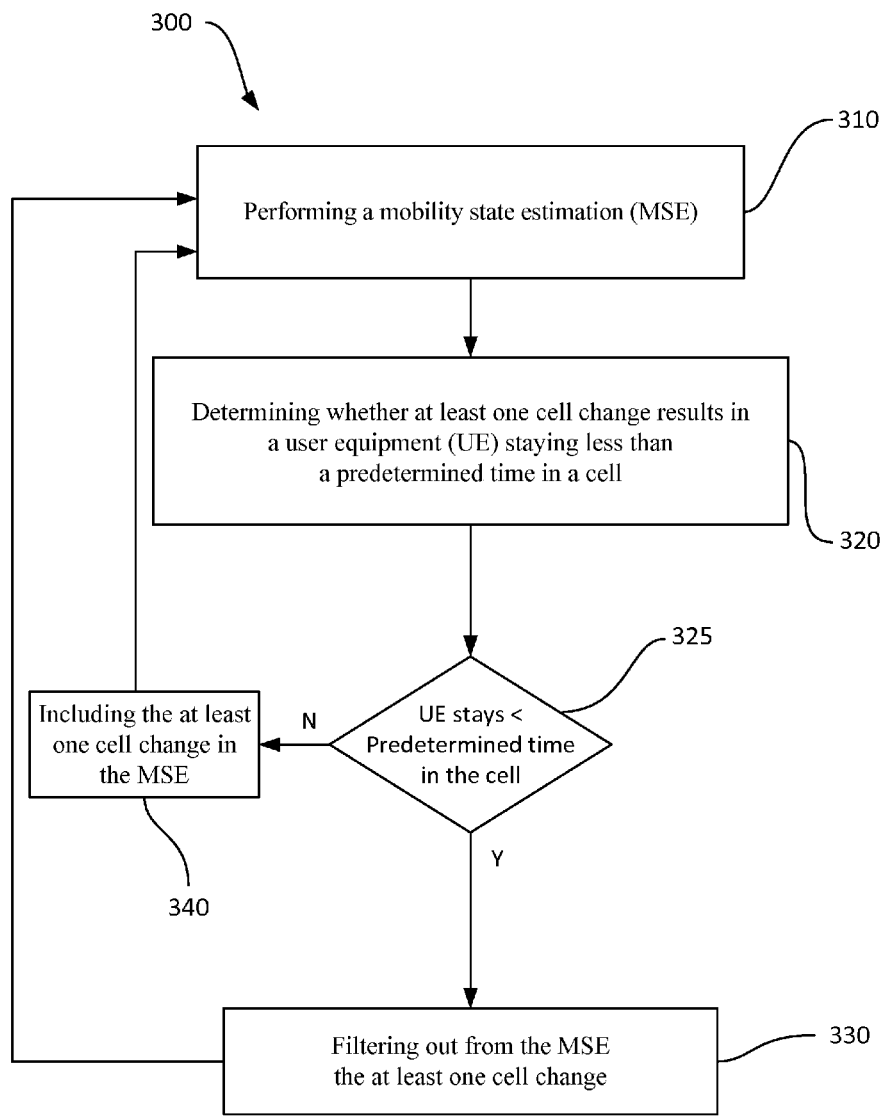
FIG. 3 illustrates a flowchart of a method according to certain embodiments.

FIG. 3 illustrates a flowchart of a method 300 according to certain embodiments. As shown in FIG. 3, a method may comprise, at 310, performing a mobility state estimation.

The method may also comprise, at 320 which branches from 310, determining whether at least one cell change results in a user equipment staying less than a predetermined time (for example, T_min) in a cell in the, for example, Long Term Evolution heterogeneous network or any other similar system that may utilize this type of procedure or count, for example, regardless of whether the user equipment returns back to its cell of origin.

The method may also comprise, at 325 which branches from 320, a qualifier asking if user equipment stays less than predetermined time in the cell.

The method may also comprise, at 330 which branches from 325, filtering out from the mobility state estimation the at least one cell change and thereafter returning to 310.

The method may also comprise, at 340 which branches from 325, including the at least one cell change in the mobility state estimation and thereafter returning to 310.

Figure 4:
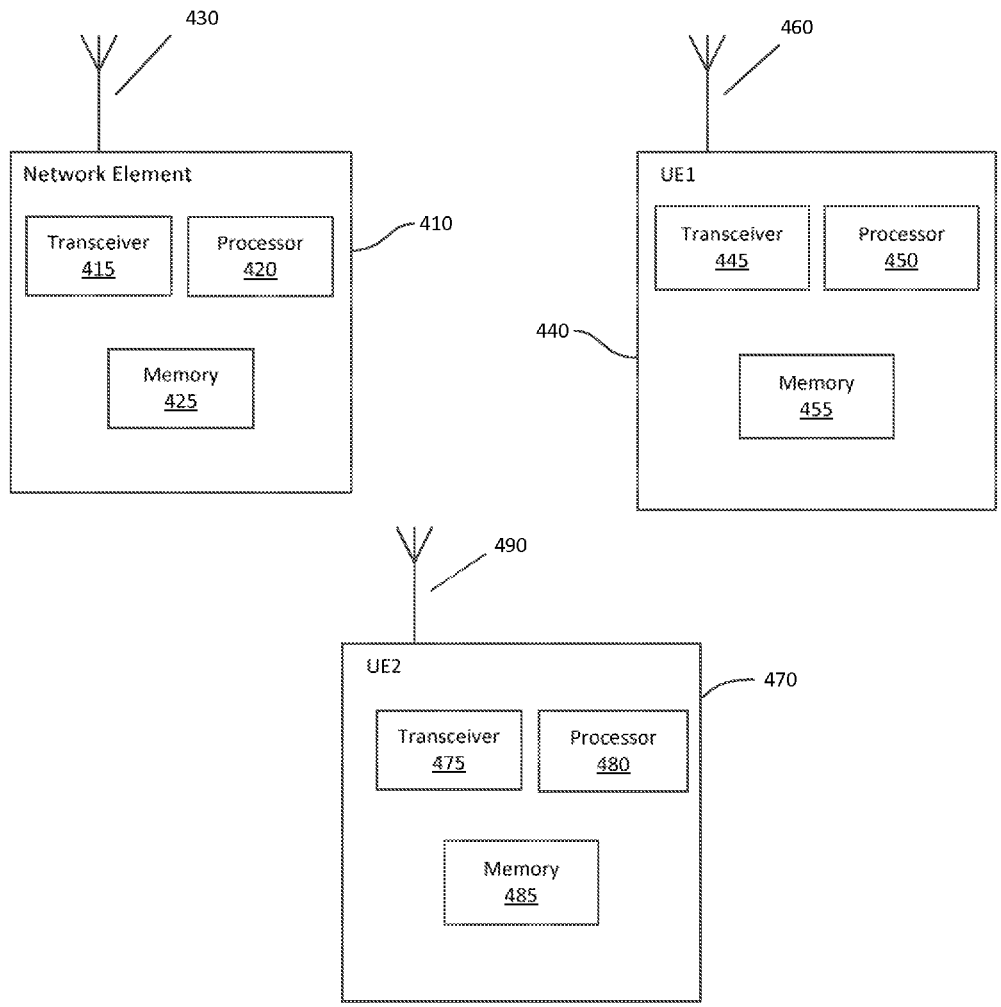
FIG. 4 illustrates a network system according to certain embodiments.

FIG. 4 illustrates a system according to certain embodiments of the invention. In one embodiment, a system may comprise several devices, such as, for example, a network element 410, a first user equipment (UE1) 440, and a second user equipment (UE2) 470. Network element 410 may correspond to HetNet element 200, shown in FIG. 2. The system may comprise more than two user equipment, although only two user equipment are shown for the purposes of illustration. The first user equipment (UE1) 440 may be a mobile telephone system and/or Voice over IP (VoIP) system. Alternatively, first user equipment (UE1) 440 may be a mobile phone, personal digital assistant (PDA), e-reader, sensor, smart meter, peripheral or any communications device. The first user equipment (UE1) 440 and/or the second user equipment (UE2) 470 may likewise be a mobile phone, PDA, e-reader, sensor, smart meter, peripheral or any communications device.

Each of the devices in the system may comprise at least one processor, respectively indicated as 420, 450, and 480. At least one memory may be provided in each device, and indicated as 425, 455, and 485, respectively. The memory may comprise computer program instructions or computer code contained therein. One or more transceiver 415, 445, and 475 may be provided, and each device may also comprise an antenna, respectively illustrated as 430, 460, and 490. Although only one antenna each is shown, many antennas and multiple antenna elements may be provided to each of the devices. Other configurations of these devices, for example, may be provided. For example, network element 410, first user equipment (UE1) 440 and second user equipment (UE2) 470 may be additionally or solely configured for wired communication, and in such a case antennas 430, 460, and 490 may illustrate any form of communication hardware, without being limited to merely an antenna.

Transceivers 415, 445, and 475 may each, independently, be a transmitter, a receiver, or both a transmitter and a receiver, or a unit or device that may be configured both for transmission and reception.

Processors 420, 450, and 480 may be embodied by any computational or data processing device, such as a central processing unit (CPU), application specific integrated circuit (ASIC), or comparable device. The processors may be implemented as a single controller, or a plurality of controllers or processors.

Memories 425, 455, and 485 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and may be processed by the processors may be any suitable form of computer program code, for example, a compiled or interpreted computer program written in any suitable programming language.

The memory and the computer program instructions may be configured, with the processor for the particular device, to cause a hardware apparatus such as network element 410, first user equipment (UE1) 440 and second user equipment (UE2) 470, to perform any of the processes described above (see, for example, FIG. 3). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

One having ordinary skill in the art will readily understand that the invention as discussed above may be practiced with steps in a different order, and/or with hardware elements in configurations which are different than those which are disclosed. Therefore, although the invention has been described based upon these embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   performing a mobility state estimation;
   determining whether at least one cell change results in a user equipment staying less than a predetermined time in a cell; and
   filtering out from the mobility state estimation the at least one cell change, when the user equipment stays less than the predetermined time in the cell,
   wherein the mobility state estimation is based on counting the number of at least one of cell handovers, cell selections, and cell reselections which occur during a time period.

2. The method of claim 1, further comprising:
   including the at least one cell change in the mobility state estimation when the user equipment stays at least the predetermined time in the cell.

3. The method of claim 1, wherein the predetermined time comprises a threshold time configured by the network.

4. The method of claim 1, wherein the predetermined time for filtering out the at least one cell change from the mobility state estimation is determined by the size of each cell.

5. The method of claim 4, wherein the predetermined time is shorter as measured in time for smaller cells than for larger cells.

6. The method of claim 4, wherein the predetermined time is set to filter out at least one of:
   the at least one cell change related to picocells from the mobility state estimation; and
   the at least one cell change related to macrocell ping-pongs from the mobility state estimation.

7. The method of claim 1, wherein the cell change comprises at least one of cell handovers, cell selection, and cell reselection.

8. The method of claim 4, wherein the predetermined time is set to filter out the at least one cell change, unless the user equipment stops within a picocell.

9. The method of claim 1, wherein picocells are filtered out of the mobility state estimation, if the user equipment is in motion.

10. An apparatus, comprising:
    at least one processor; and
    at least one memory including computer program code,
    wherein the at least one memory and the computer program code are configured to, with the at least one processor, cause the apparatus at least to
    perform a mobility state estimation;
    determine whether at least one cell change results in a user equipment staying less than a predetermined time in a cell; and
    filter out from the mobility state estimation the at least one cell change, when the user equipment stays less than the predetermined time in the cell,
    wherein the mobility state estimation is based on counting the number of cell handovers, cell selections, and cell reselections which occur during a time period.

11. The apparatus of claim 10, wherein the at least one memory and the computer program code are configured to, with the at least one processor, cause the apparatus at least to include the at least one cell change in the mobility state estimation when the user equipment stays at least the predetermined time in the cell.

12. The apparatus of claim 10, wherein the predetermined time comprises a threshold time configured by the network.

13. The apparatus of claim 10, wherein the predetermined time for filtering out the at least one cell change from the mobility state estimation is determined by the size of each cell.

14. The apparatus of claim 13, wherein the predetermined time is shorter as measured in time for smaller cells than for larger cells.

15. The apparatus of claim 13, wherein the predetermined time is set to filter out at least one of:
    the at least one cell change related to picocells from the mobility state estimation; and
    the at least one cell change related to macrocell ping-pongs from the mobility state estimation.

16. The apparatus of claim 10, wherein the cell change comprises at least one of cell handover, cell selection, and cell reselection.

17. The apparatus of claim 13, wherein the predetermined time is set to filter out the at least one cell change, unless the user equipment stops within a picocell.

18. The apparatus of claim 10, wherein picocells are filtered out of the mobility state estimation, if the user equipment is in motion.

19. A non-transitory computer readable medium encoded with instructions that, when executed in hardware, performs a process, the process comprising:
  performing a mobility state estimation;
  determining whether at least one cell change results in a user equipment staying less than a predetermined time in a cell; and
  filtering out from the mobility state estimation the at least one cell change, when the user equipment stays less than the predetermined time in the cell,
  wherein the mobility state estimation is based on counting the number of at least one of cell handovers, cell selections, and cell reselections which occur during a time period.

20. The non-transitory computer readable medium of claim 19, wherein the predetermined time for filtering out the at least one cell change from the mobility state estimation is determined by the size of each cell.

* * * * *